United States Patent
Park et al.

(10) Patent No.: US 11,448,409 B2
(45) Date of Patent: Sep. 20, 2022

(54) DEVICE AND METHOD FOR PURIFYING AIR PURIFICATION DEVICE AND METHOD

(71) Applicants: Samsung Electronics Co., Ltd., Suwon-si (KR); UNIVERSITY PUBLIC CORPORATION OSAKA, Osaka (JP)

(72) Inventors: Kitae Park, Seoul (KR); Jinkyu Kang, Hwaseong-si (KR); Haruhiko Yamasaki, Osaka (JP); Tomoyuki Kuroki, Osaka (JP); Masaaki Okubo, Osaka (JP); Tadao Yagi, Hwaseong-si (KR); Hyun Chul Lee, Hwaseong-si (KR); Joonseon Jeong, Seoul (KR); Hyoungwoo Choi, Hwaseong-si (KR)

(73) Assignees: SAMSUNG ELECTRONICS CO., LTD., Gyeonggi-Do (KR); UNIVERSITY PUBLIC CORPORATION OSAKA, Osaka (JP)

( * ) Notice: Subject to any disclaimer, the term of this patent is extended or adjusted under 35 U.S.C. 154(b) by 0 days.

(21) Appl. No.: 17/160,777

(22) Filed: Jan. 28, 2021

(65) Prior Publication Data

US 2021/0231324 A1 Jul. 29, 2021

Related U.S. Application Data

(60) Provisional application No. 62/966,747, filed on Jan. 28, 2020.

(30) Foreign Application Priority Data

Jan. 21, 2021 (KR) .................. 10-2021-0008900

(51) Int. Cl.
*F24F 8/30* (2021.01)
*B01J 19/08* (2006.01)
(Continued)

(52) U.S. Cl.
CPC ............... *F24F 8/30* (2021.01); *B01J 19/08* (2013.01); *F24F 8/167* (2021.01); *F24F 8/98* (2021.01)

(58) Field of Classification Search
CPC ....... B01J 19/08; F24F 8/30; F24F 8/98; F24F 8/167
See application file for complete search history.

(56) References Cited

U.S. PATENT DOCUMENTS

| 4,954,320 A | 9/1990 | Birmingham et al. |
| 7,160,521 B2 * | 1/2007 | Porshnev ............... B01D 53/70 422/186.04 |

(Continued)

FOREIGN PATENT DOCUMENTS

| CN | 208426869 U | 1/2019 |
| GB | 2468865 A | 3/2009 |

(Continued)

OTHER PUBLICATIONS

Tomoyuki Kuroki et al., Oxidation System of Adsorbed VOCs on Adsorbent Using Nonthermal Plasma Flow, 2011, pp. 1916-1921, vol. 47, No. 4 IEEE Transactions on Industry Applications.

(Continued)

*Primary Examiner* — Robert A Hopkins
(74) *Attorney, Agent, or Firm* — Cantor Colburn LLP

(57) ABSTRACT

An air purification device includes a reactor having a hollow shape and extending in one direction, a discharge plasma generator comprising a first electrode disposed on an outer wall of the reactor and a second electrode disposed inside the reactor, where the discharge plasma generator is configured to generate a discharge plasma in a discharge region, a plurality of dielectric particles disposed on a packed-bed of (Continued)

the reactor, a liquid supplier which supplies a liquid into the reactor, and a liquid recoverer which recovers the liquid discharged from the reactor.

25 Claims, 14 Drawing Sheets

(51) Int. Cl.
    *F24F 8/98*     (2021.01)
    *F24F 8/167*     (2021.01)

(56) References Cited

U.S. PATENT DOCUMENTS

| | | | |
|---|---|---|---|
| 7,771,672 B2 | 8/2010 | Bergeron et al. | |
| 8,246,727 B2 | 8/2012 | Comrie | |
| 8,771,600 B2 | 7/2014 | Ray | |
| 2002/0148562 A1* | 10/2002 | Aoyagi | H01J 37/32009 118/712 |
| 2017/0001144 A1 | 1/2017 | Hong et al. | |
| 2017/0021049 A1 | 1/2017 | Ohyama et al. | |

FOREIGN PATENT DOCUMENTS

| | | |
|---|---|---|
| JP | 2004283742 A | 10/2004 |
| WO | 2005065805 A1 | 7/2005 |

OTHER PUBLICATIONS

Tomoyuki Kuroki et al., Performace of a Wet-Type Nonthermal Plasma Reactor for NOx, SOx, and Wastewater Treatment, 2020, pp. 1-6, IEEE Transactions on Industry Applications.

Extended European Search Report for Application No. 21153731.1-1101 dated Jun. 15, 2021.

* cited by examiner

DEVICE AND METHOD FOR PURIFYING AIR PURIFICATION DEVICE AND METHOD

CROSS-REFERENCE TO RELATED APPLICATION

This application claims the benefit of U.S. Provisional Patent Application No. 62/966,747, filed on Jan. 28, 2020, in the United States Patent and Trademark Office, and Korean Patent Application No. 10-2021-0008900, filed on Jan. 21, 2021, in the Korean Intellectual Property Office, and all the benefits accruing therefrom under 35 U.S.C. § 119, the content of which in its entirety is herein incorporated by reference.

BACKGROUND

1. Field

The present disclosure relates to an air purification device and an air purification method that purify air fine dust and a contaminant in gas.

2. Description of the Related Art

An air purification device purifies air by collecting or decomposing fine dust and contaminants in gas, for example, air. The air purification device may be applied to industrial dust collection facilities and air conditioning/ventilation systems in buildings.

A representative method for removing fine dust and contaminants from the air includes a filter method and an electrical dust collection method. The filter method is a method of collecting fine dust and contaminants contained in the air using a filter. The filter method may have excellent removal efficiency of fine dust and contaminants and filter out various types of fine dust and contaminants from the air. However, when the amount of fine dust collected in the filter increases, the performance of the filter may deteriorate, and the pressure drop by the filter may increase. Filters may be regularly maintained or replaced. In addition, the electrical dust collection method purify air by ionizing contaminants in the air and adsorbing contaminants to a strong dust collection plate using the principle of electric discharge. However, the electric current collection method is difficult to regularly wash and manage the dust collection plate of a metal material.

SUMMARY

Provided are an air purification device and an air purification method capable of removing fine dust and contaminants through discharge plasma and solution spray.

Provided are an air purification device and an air purification method with improved performance of removing fine dust and contaminants.

Additional aspects will be set forth in part in the description which follows and, in part, will be apparent from the description, or may be learned by practice of the presented embodiments of the disclosure.

According to an aspect of an embodiment, an air purification device includes: a reactor having a hollow shape and extending in one direction; a discharge plasma generator including a first electrode disposed on an outer wall of the reactor and a second electrode disposed inside the reactor, where the discharge plasma generator is configured to generate a discharge plasma in a discharge region; a plurality of dielectric particles disposed on a packed-bed of the reactor; a liquid supplier which supplies a liquid into the reactor; and a liquid recoverer which recovers the liquid discharged from the reactor.

The liquid may include water.

The liquid may include a basic aqueous solution.

An alkaline strength (PH) of the basic aqueous solution may be determined according to an ozone concentration inside the reactor.

The liquid may be an aqueous sodium hydroxide solution having a molar concentration equal to or more than about 2 millimoles per liter (mmol/L) and equal to or less than about 20 mmol/L.

The air purification device may further include a pump which generates a pressure for delivering the liquid stored in the liquid recoverer to the liquid supplier.

A porosity of the packed-bed may be more than about 0 percentages (%) and equal to or less than about 60%.

An average particle diameter of the plurality of dielectric particles may be equal to or more than about 1 millimeters (mm) and equal to or less than about 20 mm.

The plurality of dielectric particles may include at least one of silicon oxide, boron oxide, aluminum oxide, manganese oxide, titanium oxide, barium oxide, copper oxide, or magnesium oxide.

A voltage equal to or more than about 2 kilovoltages (kV) and equal to or less than about 500 kV may be applied to the discharge region.

The air purification device may further include a high voltage generator which applies a voltage to an inside of the reactor; and a controller which controls a generation of the voltage of the high voltage generator, and the controller is which transmit a control signal for increasing a magnitude of the voltage generated by the high voltage generator to the high voltage generator as an inflow amount of contaminated air which flows into the reactor increases.

The first electrode may be a silver paste film.

The second electrode may extend in the one direction and may be spaced apart from the first electrode with a predetermined distance therebetween.

The reactor may be a glass conduit extending in the one direction.

According to an aspect of another embodiment, an air purification method includes: making a liquid flow into the reactor; generating a discharge plasma by applying a voltage to the first electrode and the second electrode; making the contaminated air flow into the reactor; and discharging the liquid and purified air from the reactor.

The air purification method may further include supplying the liquid discharged from the reactor into the liquid supplier.

The liquid may include water.

The liquid may include a basic aqueous solution.

A voltage equal to or more than about 2 kV and equal to or less than about 500 kV may be applied to generate the discharge plasma.

The air purification method may further include removing ozone using a catalyst at a rear end of the reactor.

The catalyst may include at least one of manganese oxide, copper oxide, or aluminum oxide.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
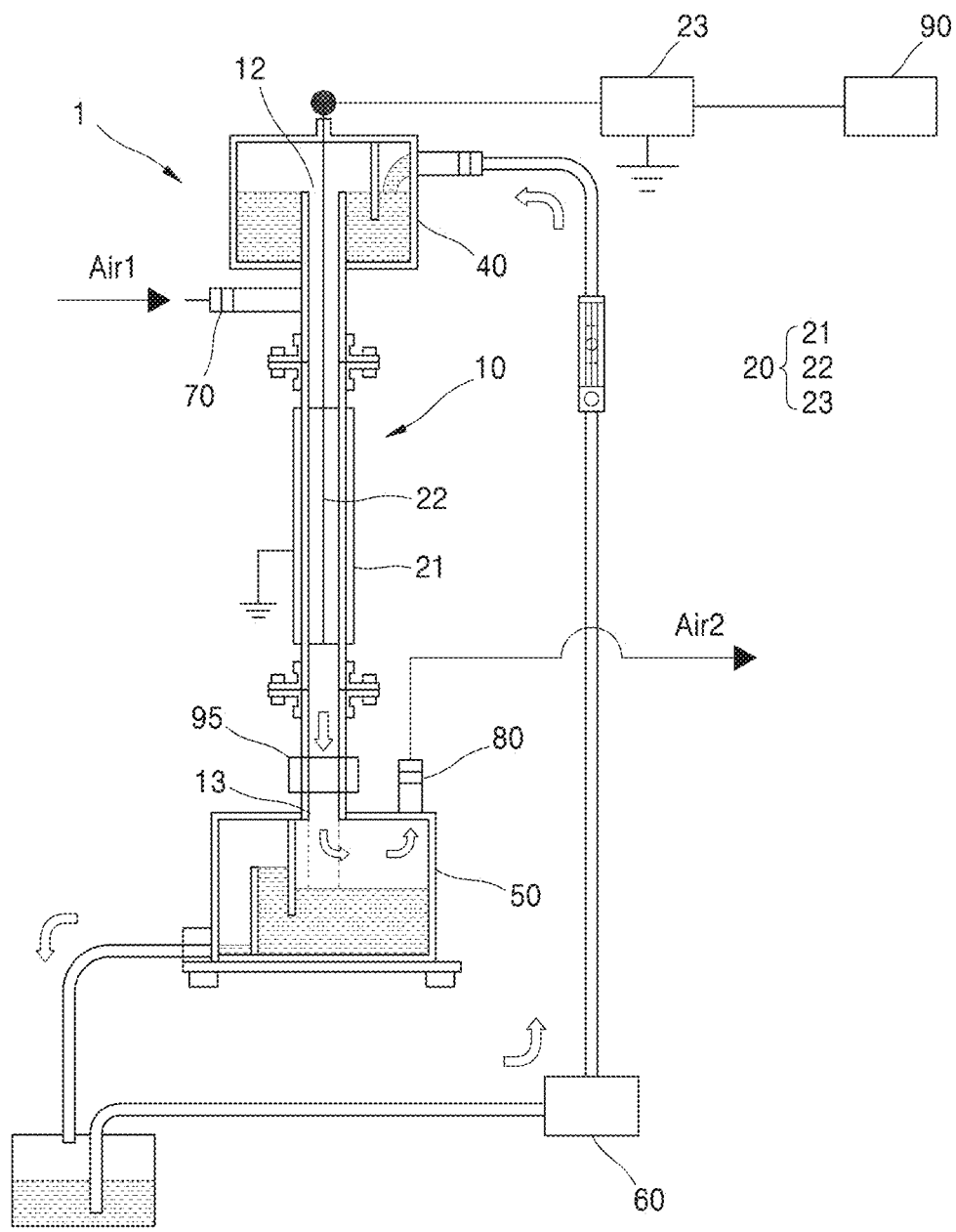
FIG. 1 is a schematic configuration diagram of an embodiment of an air purification device.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" may include any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the present disclosure will be described in detail with reference to the accompanying drawings. In the following drawings, like reference numerals refer to like elements throughout, and the size of each element in the drawings may be exaggerated for clarity and convenience of description.

Figure 2:
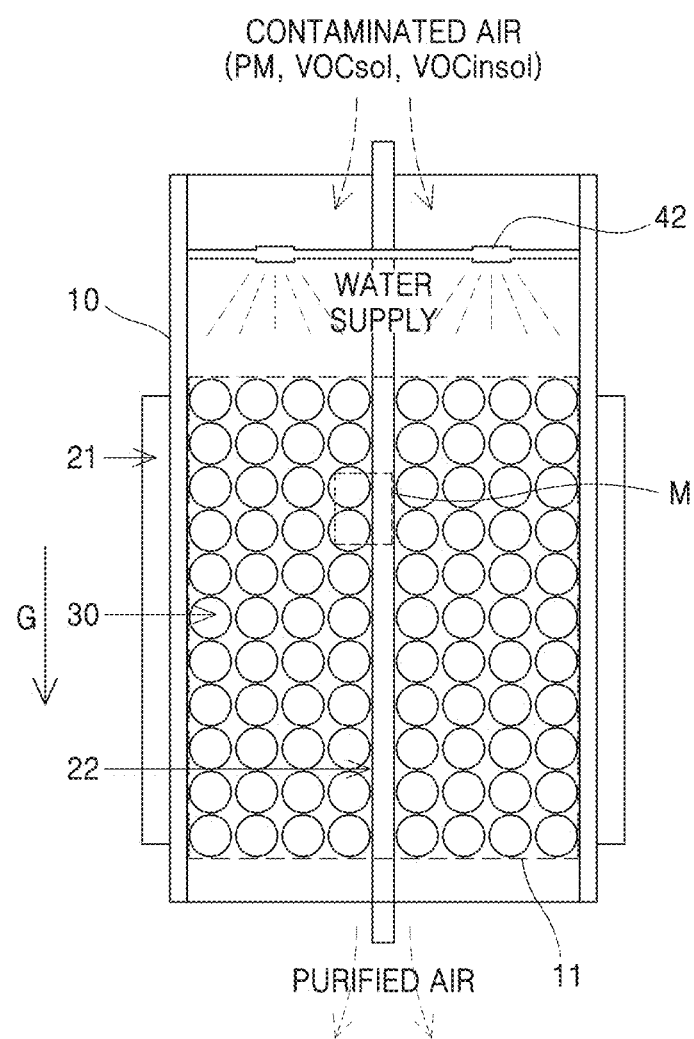
FIG. 2 is an enlarged cross-sectional view of a part of the air purification device shown in FIG. 1.

FIG. 1 is a schematic configuration diagram of an embodiment of an air purification device 1. FIG. 2 is an enlarged cross-sectional view of a part of the air purification device 1 shown in FIG. 1.

Referring to FIGS. 1 and 2, the air purification device 1 according to an embodiment may include a reactor 10 in a hollow shape (e.g., tube shape) extending in one direction, a discharge plasma generator 20 generating discharge plasma in the reactor 10, a plurality of dielectric particles 30 disposed in a packed-bed 11 of the reactor 10, liquid supplier 40 that supplies liquid into the inside of the reactor 10, a liquid recoverer 50 recovering the liquid discharged from the reactor 10, a pump 60 generating pressure for transferring the liquid stored in the liquid recoverer 50 to the liquid supplier 40, and a controller 90.

In the present specification, contaminated air $Air_1$ refers to a mixed gas including at least one of fine dust PM, a water-soluble organic compound $VOC_{sol}$, and a water-insoluble organic compound $VOC_{insol}$. As an example, the fine dust PM may include small fine dust having a diameter equal to or less than 10 micrometers (μm) and ultrafine dust of which diameter is equal to or less than 2.5 μm. In addition, the water-soluble organic compound $VOC_{sol}$ is a volatile organic compound, and may include a gaseous substance that may be trapped in water or an aqueous solution and removed, for example, ammonia ($NH_3$), acetaldehyde ($CH_3CHO$), ozone ($O_3$) and acetic acid ($CH_3COOH$). In contrast, the water-insoluble organic compound $VOC_{insol}$ is a volatile organic compound that is not collected in water or aqueous solution, and may include, for example, benzene ($C_6H_6$), formaldehyde ($CH_2O$), toluene ($C_6H_5CH_3$), etc. However, the present disclosure according to the invention is not limited thereto, and any gas that may be decomposed and ionized by a discharge plasma and discharged to the outside of the reactor 10 may be included in the contaminated air $Air_1$.

The reactor 10 forms a flow path of the contaminated air $Air_1$ and liquid. In addition, the packed-bed 11 in which the plurality of dielectric particles 30 are disposed is provided inside the reactor 10. As an example, the packed-bed 11 may be a discharge region in which the discharge plasma is generated by using the discharge plasma generator 20. However, the present disclosure according to the invention is not limited thereto, and another region including the packed-bed 11 may be a discharge region in another embodiment.

The reactor 10 according to an embodiment may extend in one direction (e.g., direction from top to bottom as shown in FIGS. 1 and 2) and may have the hollow shape through which the contaminated air $Air_1$ and liquid may flow. However, the shape of the reactor 10 is not particularly limited, and for example, the cross-sectional shape of the reactor 10 may be various, such as a circular shape or a polygonal shape. The cross-sectional shape of the reactor 10 of the present embodiment is circular. As an example, the reactor 10 may be a glass conduit or an aluminum conduit extending in one direction. However, the present disclosure according to the invention is not limited thereto, and any hollow conduit capable of generating discharge plasma may be used as the reactor 10.

According to an embodiment, the contaminated air $Air_1$ is supplied to the reactor 10 through the contaminated air inlet 70 by a blower (not shown). The contaminated air $Air_1$ moves along the air flow path formed by the reactor 10 and is discharged through a purified air outlet 80. In addition, the liquid supplied from the liquid supplier 40 (to be described later) may be introduced through a first end 12 of the reactor 10, and the liquid to be stored in the liquid recoverer 50 may be discharged through a second end 13 of the reactor 10.

The discharge plasma generator 20 may include a first electrode 21 disposed on the outer wall of the reactor 10, a second electrode 22 disposed inside the reactor 10, and a high voltage generator 23. The first electrode 21 according to an embodiment is a ground electrode, and the discharge region (i.e., the packed-bed 11) in which discharge plasma may be generated may be surrounded by the first electrode 21. For example, the first electrode 21 may be a silver paste film and disposed to surround the outer wall of the reactor 10.

In addition, the second electrode 22 is a power electrode, and may be disposed to be spaced apart from the first electrode 21 with a certain distance therebetween in the discharge region in which discharge plasma may be generated. For example, the second electrode 22 may be a steel wire extending in one direction (e.g., vertical direction in FIG. 2) and disposed inside the reactor 10.

Also, the high voltage generator 23 may apply a high voltage to the discharge region in which discharge plasma may be generated. The high voltage generator 23 according to an embodiment may include a sinusoidal AC power supply and a transformer. The high voltage generator 23 may continuously apply a high voltage to the inside of the reactor 10, for example, to the discharge region in which discharge plasma may be generated through the above-described electric system. As an example, the voltage applied to the discharge region may be equal to or more than 2 kilovoltages (kV) and equal to or less than 500 kV, and a frequency of the AC power may be equal to or more than 10 Hertz (Hz) and equal to or less than 1000 Hz, but the present disclosure according to the invention is not limited thereto. In addition, a separation distance between the first electrode 21 and the second electrode 22 in the discharge region may be equal to or more than 10 millimeters (mm) or equal to or less than 100 mm, and accordingly, an electric field may be equal to or more than 2 kilovoltages per centimeter (kV/cm) and equal to or less than 5 kV/cm may be applied to the discharge region (i.e., the packed-bed 11).

The plurality of dielectric particles 30 may be disposed in the packed-bed 11 inside the reactor 10. The plurality of dielectric particles 30 according to an embodiment may induce polarized and ionized contaminants. For example, the plurality of dielectric particles 30 may include a dielectric material that may be polarized in the discharge region generated by the discharge plasma generator 20. As an example, the plurality of dielectric particles 30 may include at least one of silicon oxide, boron oxide, aluminum oxide, manganese oxide, titanium oxide, barium oxide, copper oxide, and magnesium oxide, or at least one of mixtures of the substances.

In addition, as an example, the plurality of dielectric particles 30 may define certain pores to adjust the time that the contaminated air $Air_1$ remains in the reactor 10. For example, the plurality of dielectric particles 30 may have a bead shape having a certain particle diameter, for example, an average diameter equal to or more than 1 mm and equal to or less than 20 mm. However, the present disclosure according to the invention is not limited thereto, and the plurality of dielectric particles 30 may have another three-dimensional ("3D") shape such as an arbitrary rectangular parallelepiped in another embodiment.

The plurality of dielectric particles 30 may be disposed on the packed-bed 11, and accordingly, the packed-bed 11 on which the plurality of dielectric particles 30 are disposed may include a porosity more than 0 percentages (%) and equal to or less than 60%. As an example, in order to adjust the time that the contaminated air $Air_1$ and liquid remain in the reactor 10, the porosity of the packed-bed 11 may be adjusted by adjusting the diameter of the plurality of dielectric particles 30 disposed on the packed-bed 11. For example, it is desirable to reduce the porosity of the packed-bed 11 in order to increase the time that the contaminated air $Air_1$ and liquid remain in the reactor 10. In this case, by reducing the average diameter of the plurality of dielectric particles 30, the porosity of the packed-bed 11 may be reduced.

In addition, a water film 31 (refer to FIG. 3A) of liquid may be formed on the surface of each of the plurality of dielectric particles 30 according to an embodiment to collect the contaminated air $Air_1$. The liquid supplied from the liquid supplier 40 (which will be described later) moves downward in a gravity direction G. In this case, the liquid moving downward and each of the plurality of dielectric particles 30 may contact each other. The water film 31 may be formed on the surface of each of the plurality of dielectric particles 30 by contacting the liquid moving downward and each of the plurality of dielectric particles 30. The contaminated air $Air_1$ disposed adjacent to the water film 31 described above may be collected by the water film 31 and discharged to the outside of the reactor 10 together with the liquid.

The liquid supplier 40 may store liquid and supply the stored liquid to the reactor 10. As an example, the liquid supplier 40 may include one or more spray nozzles 42 capable of spraying the liquid stored in the liquid supplier 40 into the reactor 10. The liquid stored in the liquid supplier 40 may be any fluid capable of collecting the contaminated air $Air_1$ and discharging the contaminated air $Air_1$ to the outside of the reactor 10. For example, the liquid may be water or a basic aqueous solution.

As an example, water stored in the liquid supplier 40 is sprayed into the reactor 10 in the form of fine droplets through the spray nozzle 42. In this process, the liquid adheres to the surface of each of the plurality of dielectric particles 30 to form the water film 31. Part of the contaminated air $Air_1$ is attracted to each of the plurality of dielectric particles 30 and collected in the water film 31. In addition, the flow direction of the contaminated air $Air_1$ may be formed to be windingly by the plurality of dielectric particles 30. Accordingly, the contact region between the water film 31 formed on the surface of each of the plurality of dielectric particles 30 and the contaminated air $Air_1$ may increase, and thus the contaminated air $Air_1$ may be more easily collected in the water film 31. In the reactor 10, a gas-liquid mixture fluid in which the contaminated air $Air_1$ and liquid are mixed is formed. The gas-liquid mixture fluid flows toward the second end 13 of the reactor 10 and is discharged to the outside of the reactor 10.

As an example, ozone $O_3$ may be generated from oxygen $O_2$ in the air by the discharge plasma generator 20. When ozone $O_3$ is generated in the reactor 10 and the concentration of ozone $O_3$ increases, the basic aqueous solution may be stored in the liquid supplier 40 to prevent this. As used herein, the basic aqueous solution is defined as an aqueous solution with a pH greater than 7. As an example, the basic aqueous solution may be an aqueous sodium hydroxide NaOH solution having a molar concentration equal to or more than 2 millimoles per liter (mmol/L) and equal to or less than 20 mmol/L. An alkaline strength PH of the basic aqueous solution may also be determined according to the concentration of ozone $O_3$ in the reactor 10. For example, when the concentration of ozone $O_3$ in the reactor 10 increases, the alkaline strength PH of the basic aqueous solution may also increase in proportion thereto.

The liquid recoverer 50 may store the liquid discharged to from the reactor 10 and supply the stored liquid back to the liquid supplier 40. As an example, the liquid recoverer 50 stores an emission in a gas-liquid mixture state discharged from the reactor 10. In this case, the liquid recoverer 50 may purify the emission in a gas-liquid mixture state through a certain purification device (not shown). The purified liquid may be supplied back to the liquid supplier 40 using a pump 60 and may be reused in the liquid supplier 40.

The controller 90 may control, for example, at least one other component (e.g., a hardware or software component) connected to the controller 90 by executing software (e.g., a program) and perform various data processing or calculations. According to an embodiment, the controller 90 may generate a control signal for the high voltage generator 23 to control the level of voltage generated by the high voltage generator 23. For example, when an inflow amount of the contaminated air $Air_1$ flowing into the reactor 10 increases or the concentration of a contamination material increases, the controller 90 may transmit the control signal that increases the magnitude of the voltage generated by the high voltage generator 23 to the high voltage generator 23. Accordingly, even when the inflow amount of the contaminated air $Air_1$ increases, the purification efficiency of the contaminated air $Air_1$ may be maintained or increased.

A catalyst reactor 95 may be disposed at the rear end of the reactor 10 to remove ozone $O_3$ discharged from the reactor 10 using a catalyst. As an example, the catalyst included in the catalyst reactor 95 may include at least one of manganese oxide, copper oxide, and aluminum oxide, or at least one of mixtures between the substances.

As described above, the air purification device 1 may purify the contaminated air $Air_1$ by simultaneously applying decomposition by discharge plasma and capture by liquid. Hereinafter, purification of the contaminated air $Air_1$ using discharge plasma and contaminated air $Air_1$ by classifying the fine dust PM, the water-soluble organic compounds $VOC_{insol}$, the water-insoluble organic compound $VOC_{insol}$, and ozone $O_3$ included in the contaminated air $Air_1$ is described in more detail.

Figure 3A:
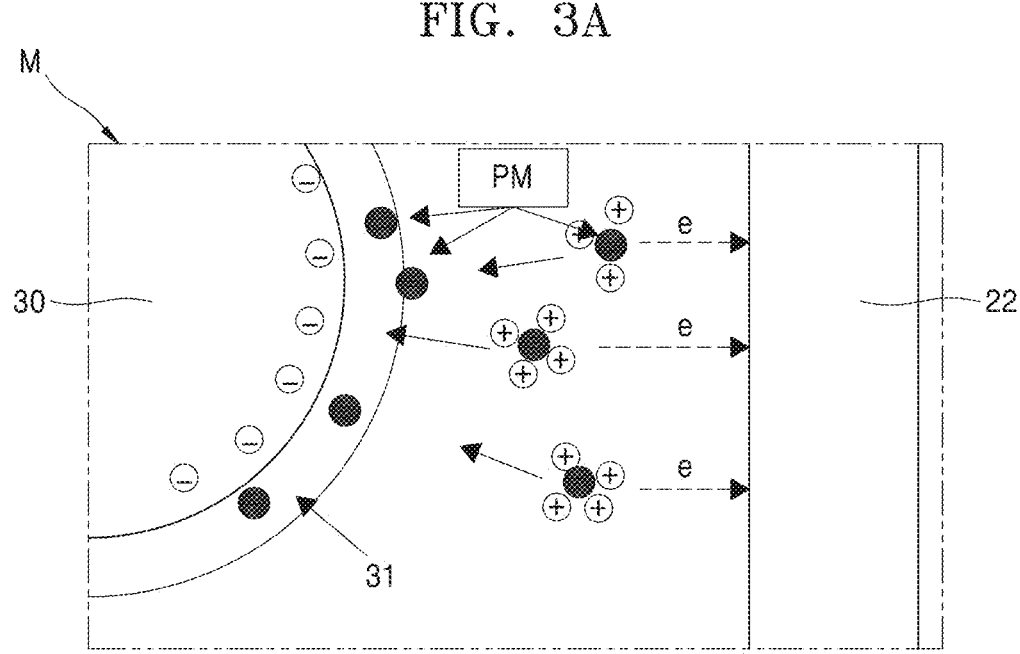
FIGS. 3A and 3B are schematic diagrams of an enlarged region M shown in FIG. 2.
Figure 3B:
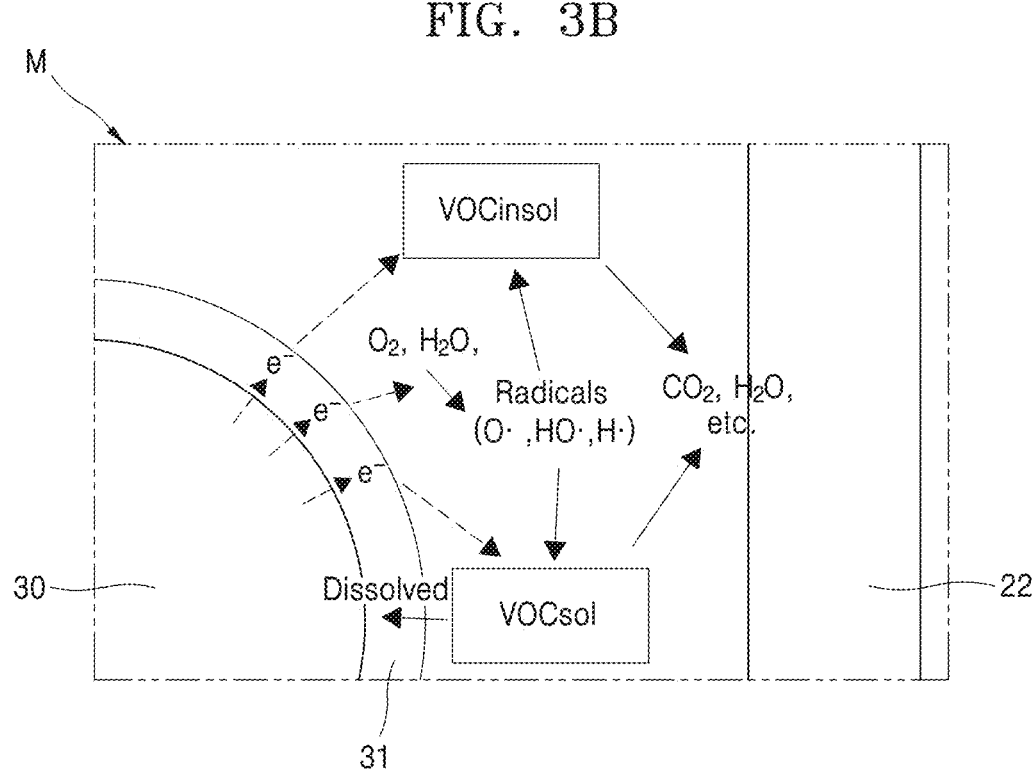

FIGS. 3A and 3B are schematic diagrams of an enlarged region M shown in FIG. 2.

Referring to FIG. 3A, when a high voltage is applied to the packed-bed 11 using the discharge plasma generator 20 according to an embodiment, electrons e may be generated in the second electrode 22 itself disposed inside the reactor 10, or electrons e may be generated in the gas around the second electrode 22, and thus discharge plasma may be formed around the second electrode 22. Electrons e generated around the second electrode 22 move to the second electrode 22 to which an opposite charge is applied by electrical attraction. Meanwhile, ions from which electrons are separated electrically charge and surround the fine dust PM, so that the fine dust PM has a positive charge.

As an example, when a high voltage is applied to the packed-bed 11 using the discharge plasma generator 20, an electric field is applied between the first electrode 21 and the second electrode 22. In this case, the plurality of dielectric particles 30 disposed in the electric field may be polarized. As an example, as shown in FIG. 3A, the dielectric particle 30 disposed to face the second electrode 22 has a negative charge. As described above, the fine dust PM having the positive charge by plasma moves toward the plurality of dielectric particles 30 to which the opposite charge (−) is applied by electric attraction. In this case, the water film 31 by a liquid is formed on the surface of each of the plurality of dielectric particles 30, and the fine dust PM having the positive charge is collected by the water film 31. The liquid forming the water film 31 moves in a direction of gravity G and is discharged to the outside of the reactor 10. Accordingly, the fine dust PM collected in the liquid may also be discharged to the outside of the reactor 10 together with the liquid As described above, by filling the packed-bed 11 with the plurality of dielectric particles 30 and spraying the liquid to the packed-bed 11, the water film 31 may be formed on the surface of each of the plurality of dielectric particles 30. Accordingly, a contact region between the liquid forming the water film 31 and the fine dust PM may be improved, thereby improving a collection rate of the fine dust PM. In addition, by changing the fine dust PM to a specific charge state (e.g., positive charge) using the discharge plasma generator 20, and by changing the plurality of dielectric particles 30 to an opposite charge state (e.g., negative charge), attraction force may be formed between the plurality of dielectric particles 30 and the fine dust PM. Accordingly, the water film 31 formed on each of the plurality of dielectric particles 30 may improve the collection rate of the fine dust PM.

The air purification device 1 according to an embodiment may simultaneously also remove not only the fine dust PM but also the water-soluble organic compound $VOC_{sol}$ and the water-insoluble organic compound $VOC_{insol}$ by using the liquid sprayed into the discharge plasma generator 20 and the reactor 10.

Referring to FIG. 3B, a primary method of removing the water-soluble organic compound $VOC_{sol}$ according to an embodiment is to dissolve the water-soluble organic compound $VOC_{sol}$ in the liquid supplied to the inside of the reactor 10 and discharge the water-soluble organic compound $VOC_{sol}$ together with the liquid. However, according to a flow rate of the water-soluble organic compound $VOC_{sol}$, the time when the water-soluble organic compound $VOC_{sol}$ remains in the reactor 10 may not be relatively sufficient. In this case, because the contact between the water-soluble organic compound $VOC_{sol}$ and the liquid is not sufficient, the water-soluble organic compound $VOC_{sol}$ may not be sufficiently removed.

In order to supplement the above-described primary method, the water-soluble organic compound $VOC_{sol}$ may be directly decomposed using the discharge plasma generator 20. When a high voltage is applied to the packed-bed 11 using the discharge plasma generator 20 according to an embodiment, the water-soluble organic compound $VOC_{sol}$ may be decomposed using OH radical (OH.). As an example, when the high voltage is applied to the packed-bed 11 using the discharge plasma generator 20, oxygen (02) in the air around the second electrode 22 and water molecules ($H_2O$) are broken into a neutral gas ionic state (i.e., a plasma state), and OH radical (OH.) may be generated from this ion. As an example, acetic acid ($CH_3COOH$), acetaldehyde ($CH_3CHO$), and methane ($CH_4$) in the water-soluble organic compound $VOC_{sol}$ may be decomposed into carbon dioxide ($CO_2$) and water ($H_2O$) as shown in Reaction Equations 1 to 3 below.

$$CH_3COOH + 4OH + O_2 \rightarrow 2CO_2 + 4H_2O \quad \text{[Reaction Equation 1]}$$

$$CH_3CHO + 6OH + O_2 \rightarrow 2CO_2 + 5H_2O \quad \text{[Reaction Equation 2]}$$

$$CH_4 + 4OH + O_2 \rightarrow CO_2 + 4H_2O \quad \text{[Reaction Equation 3]}$$

Carbon dioxide ($CO_2$) and water ($H_2O$) which are decomposition products may be discharged to the outside of the reactor 10 together with the liquid. As described above, the removal efficiency of the water-soluble organic compound $VOC_{sol}$ may be improved by using the primary method of dissolving the water-soluble organic compound $VOC_{sol}$ with the liquid and the secondary method using the discharge plasma generator 20.

The water-insoluble organic compound $VOC_{insol}$ may not be dissolved in the liquid supplied to the reactor 10, for example, water or a basic aqueous solution. Therefore, the method of dissolving and removing the water-insoluble organic compound $VOC_{insol}$ in the liquid may not be used.

According to an embodiment, the discharge plasma generator 20 may be used to directly decompose the water-insoluble organic compound $VOC_{insol}$. When a high voltage is applied to the packed-bed 11 using the discharge plasma generator 20 according to an embodiment, the water-insoluble organic compound $VOC_{insol}$ may be decomposed by using OH radical (OH.). As an example, when the high voltage is applied to the packed-bed 11 using the discharge plasma generator 20, oxygen ($O_2$) in the air around the second electrode 22 and water molecules ($H_2O$) are broken into a neutral gas ionic state (i.e., a plasma state), and OH radical (OH.) may be generated from this ion. As an example, water-insoluble organic toluene ($C_6H_5CH_3$) may be decomposed into carbon dioxide ($CO_2$) and water ($H_2O$) by OH radical (OH.).

Carbon dioxide ($CO_2$) and water ($H_2O$) which are decomposition products may be discharged to the outside of the reactor 10 together with the liquid. As described above, the air purification device 1 according to an embodiment may improve the removal efficiency of the water-insoluble organic compound $VOC_{insol}$ by using the decomposition method using the discharge plasma generator 20.

Figure 4:
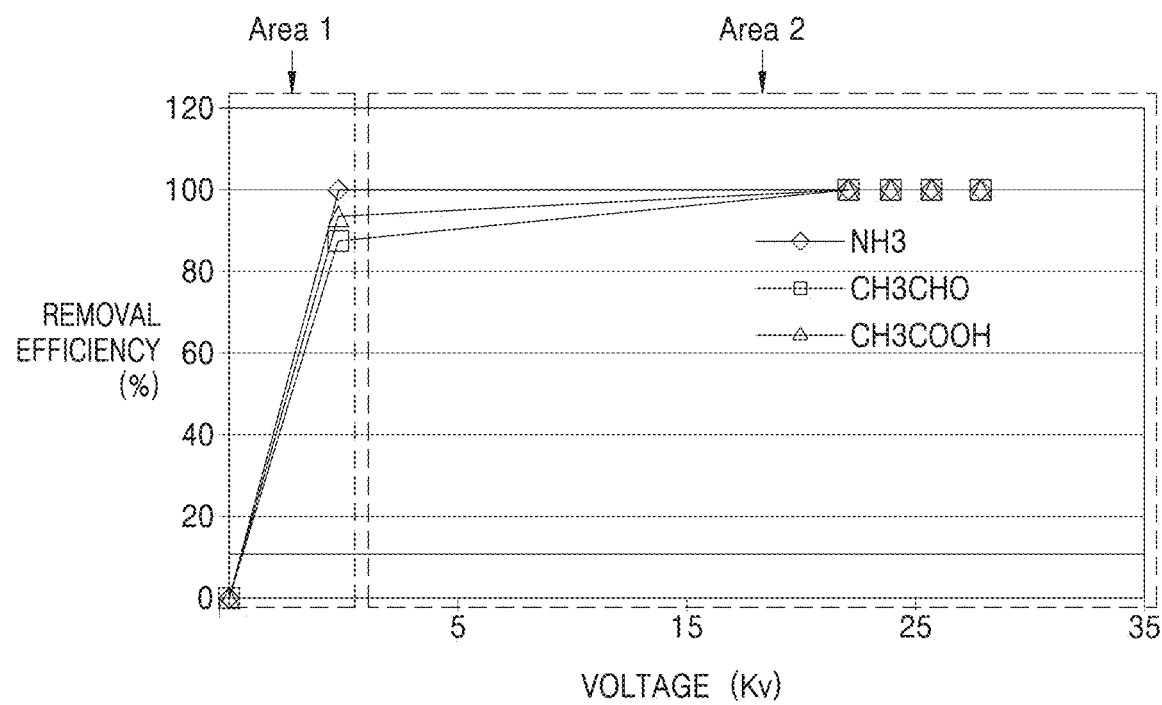
FIG. 4 is a graph showing plasma voltage and removal efficiency of a water-soluble organic compound according to an embodiment.

FIG. 4 is a graph showing plasma voltage and removal efficiency of the water-soluble organic compound $VOC_{sol}$ according to an embodiment.

Experimental Example 1

At atmospheric pressure and a temperature close to room temperature, reaction between the air purification device 1 and the water-soluble organic compound $VOC_{sol}$ is carried out.

A volume flow rate of a mixture ($NH3:CH3CHO:CH3COOH=1:1:1$) of ammonia ($NH_3$), acetaldehyde ($CH_3CHO$), and acetic acid ($CH_3COOH$) which are water-soluble organic compounds $VOC_{sol}$ is 4 liters per minute (L/min). As a dielectric barrier of the reactor 10, a quartz tube having an inner diameter of 20 mm and a thickness of 2 mm is used. A stainless steel rod of a 2 mm diameter is used as a second electrode (22: a power electrode), and a silver paste film is used as the first electrode (21: a ground electrode). In the reactor 10, a discharge region having a length of 280 mm is surrounded by the ground electrode. A discharge gap between the inner surface of the quartz tube and a high voltage electrode that is the second electrode 22 is 9 mm. In this case, the volume of the plasma discharge region is fixed to 80.865 cubic centimeters ($cm^3$). The plurality of dielectric particles 30 are completely filled in the packed-bed 11 provided in the plasma discharge region (i.e., the packed-bed 11). In this case, the plurality of dielectric particles 30 are spherical glass particles having a diameter of 6 mm, and the porosity of the packed-bed 11 is 58%. Water ($H_2O$) is used a liquid supplied into the reactor 10 and is sprayed at a volume flow rate of 100 milliliters per minute (mL/min). A sinusoidal AC power supply is connected to a transformer, and a high voltage is continuously applied to the plasma discharge region through this electrical system. The voltage applied to the plasma discharge region changes from 0 kV to 35 kV, and in this regard, an electric field changes from 0 kV/cm to 38.89 kV/cm. The purified air outlet 80 measures a residual ratio of ammonia ($NH_3$), acetaldehyde ($CH_3CHO$), and acetic acid ($CH_3COOH$).

Referring to FIG. 4, it may be seen that ammonia ($NH_3$) is completely removed from a first region Area 1 in which a voltage equal to or less than 5 kV is applied to the plasma discharge region. That is, ammonia ($NH_3$) is removed to the liquid recoverer 50 by water ($H_2O$) supplied into the reactor 10. It may be seen that more than 80% of acetaldehyde ($CH_3CHO$) and acetic acid ($CH_3COOH$) is also removed from the first region Area 1 in which the voltage equal to or less than 5 kV is applied to the plasma discharge region. It may be seen that the remaining substances among acetaldehyde ($CH_3CHO$) and acetic acid ($CH_3COOH$) are decomposed into carbon dioxide ($CO_2$) and water ($H_2O$) and removed in a second region Area to which a high voltage equal to or higher than 25 kV is applied. Therefore, it may be seen that most of the water-soluble organic compound $VOC_{sol}$ is collected by the liquid and is primarily removed. It may be seen that the remaining water-soluble organic compound $VOC_{sol}$ is decomposed by the high voltage applied to the plasma discharge region and removed.

When a ratio of ammonia ($NH_3$) having a high solubility to the liquid is high, the time when the water-soluble organic compound $VOC_{sol}$ remains in the reactor 10 need to be improved. To this end, an average diameter of the plurality of dielectric particles 30 may be reduced such that a porosity inside the packed-bed 11 may be reduced.

When a ratio of acetaldehyde ($CH_3CHO$) and acetic acid ($CH_3COOH$) having a relatively low solubility to the liquid is high, the removal efficiency of water-soluble organic compounds $VOC_{sol}$ may be improved by increasing the voltage applied to the plasma discharge region (i.e., the packed-bed 11). For example, the controller 90 may generate a control signal with respect to the high voltage generator 23 to increase the magnitude of voltage generated by the high voltage generator 23, thereby improving the removal efficiency of the water-soluble organic compound $VOC_{sol}$.

Figure 5A:
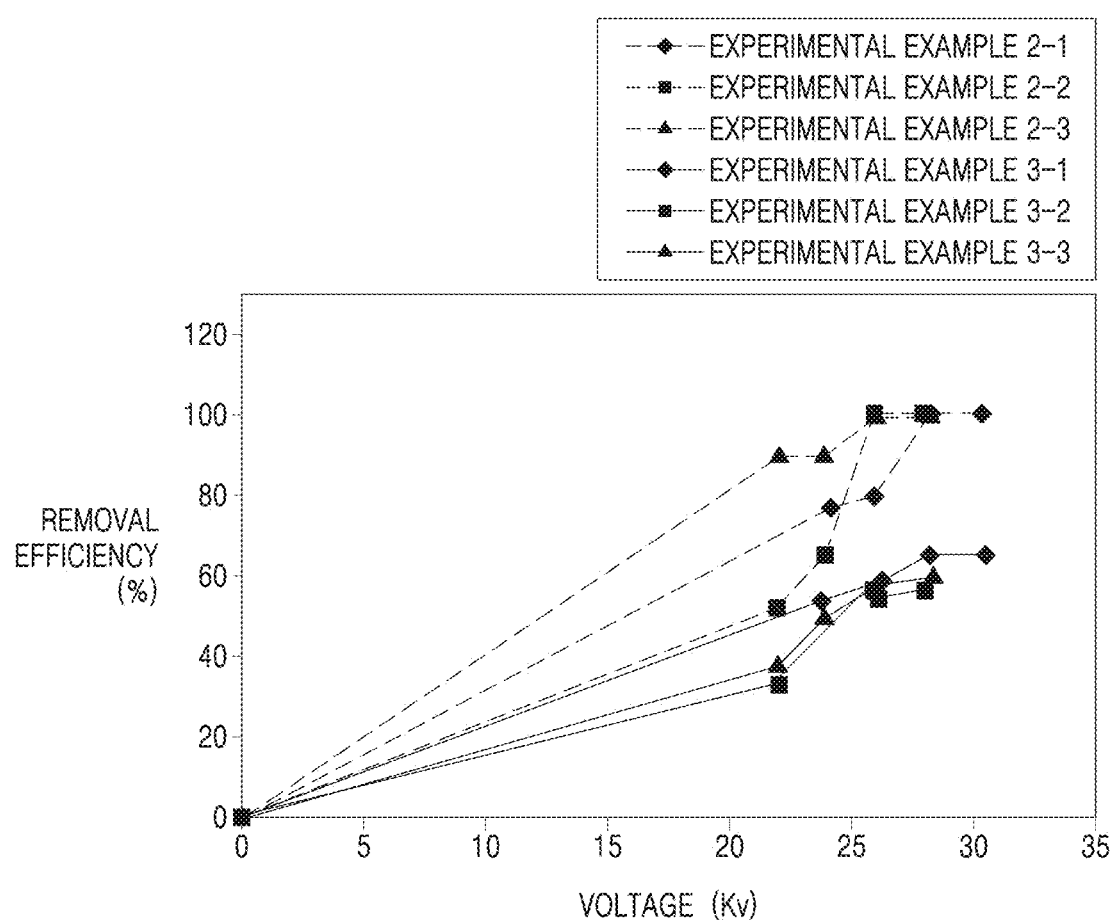
FIG. 5A is a graph showing plasma voltage and removal efficiency of a water-insoluble organic compound according to an embodiment and a comparative example.

FIG. 5A is a graph showing plasma voltage and removal efficiency of the water-insoluble organic compound ($VOC_{insol}$) according to an embodiment and a comparative example.

Experimental Example 2-1 to Experimental Example 2-3

Except for a type and volume flow rate of contaminated air supplied to the reactor 10 and a volume flow rate of a liquid, the remaining experimental methods are the same as in Experimental Example 1.

In Experimental Example 2-1, the water-insoluble organic compound $VOC_{insol}$ flowing into the reactor 10 is toluene ($C_6H_5CH_3$) of 22 parts per million (ppm), and the volume flow rate of contaminated air including toluene ($C_6H_5CH_3$) is 4 L/min. No liquid flows into the reactor 10.

In Experimental Example 2-2, the water-insoluble organic compound $VOC_{insol}$ flowing into the reactor 10 is toluene ($C_6H_5CH_3$) of 22 ppm, and the volume flow rate of contaminated air including toluene ($C_6H_5CH_3$) is 4 L/min. The liquid flowing into the reactor 10 is water ($H_2O$), and the volume flow rate thereof is 100 mL/min.

In Experimental Example 2-3, the water-insoluble organic compound $VOC_{insol}$ flowing into the reactor 10 is toluene ($C_6H_5CH_3$) of 22 ppm, and the volume flow rate of contaminated air including toluene ($C_6H_5CH_3$) is 4 L/min. The liquid flowing into the reactor 10 is water ($H_2O$), and the volume flow rate is 200 mL/min.

Experimental Example 3-1 to Experimental Example 3-3

Except for a type and volume flow rate of contaminated air supplied to the reactor 10 and a volume flow rate of a liquid, the remaining experimental methods are the same as in Experimental Example 1.

In Experimental Example 3-1, the water-insoluble organic compound $VOC_{insol}$ flowing into the reactor 10 is toluene ($C_6H_5CH_3$) of 22 ppm, and the volume flow rate of contaminated air including toluene ($C_6H_5CH_3$) is 10 L/min. No liquid flows into the reactor 10.

In Experimental Example 3-2, the water-insoluble organic compound $VOC_{insol}$ flowing into the reactor 10 is toluene ($C_6H_5CH_3$) of 22 ppm, and the volume flow rate of contaminated air including toluene ($C_6H_5CH_3$) is 10 L/min. The liquid flowing into the reactor 10 is water ($H_2O$), and the volume flow rate thereof is 100 mL/min.

In Experimental Example 3-3, the water-insoluble organic compound $VOC_{insol}$ flowing into the reactor 10 is toluene ($C_6H_5CH_3$) of 22 ppm, and the volume flow rate of contaminated air including toluene ($C_6H_5CH_3$) is 10 L/min. The liquid flowing into the reactor 10 is water ($H_2O$), and the volume flow rate is 200 mL/min.

Referring to FIG. 5A, in Experimental Examples 2-1 to 2-3, it may be seen that a removal rate of toluene ($C_6H_5CH_3$) increases as a voltage increases to 25 kV in a plasma discharge region. However, toluene ($C_6H_5CH_3$) is removed according to the voltage applied to the plasma discharge region regardless of the volume flow rate of water ($H_2O$)) supplied to the reactor 10. Accordingly, it may be seen that the water-insoluble organic compound $VOC_{insol}$ remains regardless of the flow rate of the liquid supplied to the reactor 10.

In addition, in Experimental Examples 3-1 to 3-3, it may be seen that the removal rate of toluene ($C_6H_5CH_3$) increases as the voltage rises to 25 kV in the plasma discharge region (i.e., the packed-bed 11). However, compared to Experimental Examples 2-1 to 2-3, as the volume flow rate of contaminated air including toluene ($C_6H_5CH_3$) increases, the time when toluene ($C_6H_5CH_3$) remains in the reactor 10 may be reduced. Accordingly, it may be seen that only about 60% of toluene ($C_6H_5CH_3$) is removed even when the voltage rises to 30 kV in the plasma discharge region.

As described above, when the time when toluene ($C_6H_5CH_3$) remains in the reactor 10 is reduced as the volume flow rate of contaminated air including toluene ($C_6H_5CH_3$) increases, in order to completely remove toluene ($C_6H_5CH_3$), the time when toluene ($C_6H_5CH_3$) remains in the reactor 10 needs to increase. For example, by reducing the volume flow rate of toluene ($C_6H_5CH_3$) supplied to the reactor 10, or by reducing a porosity inside the packed-bed 11, the time when toluene ($C_6H_5CH_3$) remains in the reactor 10 may increase. In the above-described embodiment, the contaminated air $Air_1$ each including the fine dust PM, the water-soluble organic compound $VOC_{sol}$, and the water-insoluble organic compound $VOC_{insol}$ is described, but the air purification device 1 according to an embodiment may purify the contaminated air $Air_1$ including two or more of the fine dust PM, the water-soluble organic compound $VOC_{sol}$, and the water-insoluble organic compound $VOC_{insol}$.

Figure 5B:
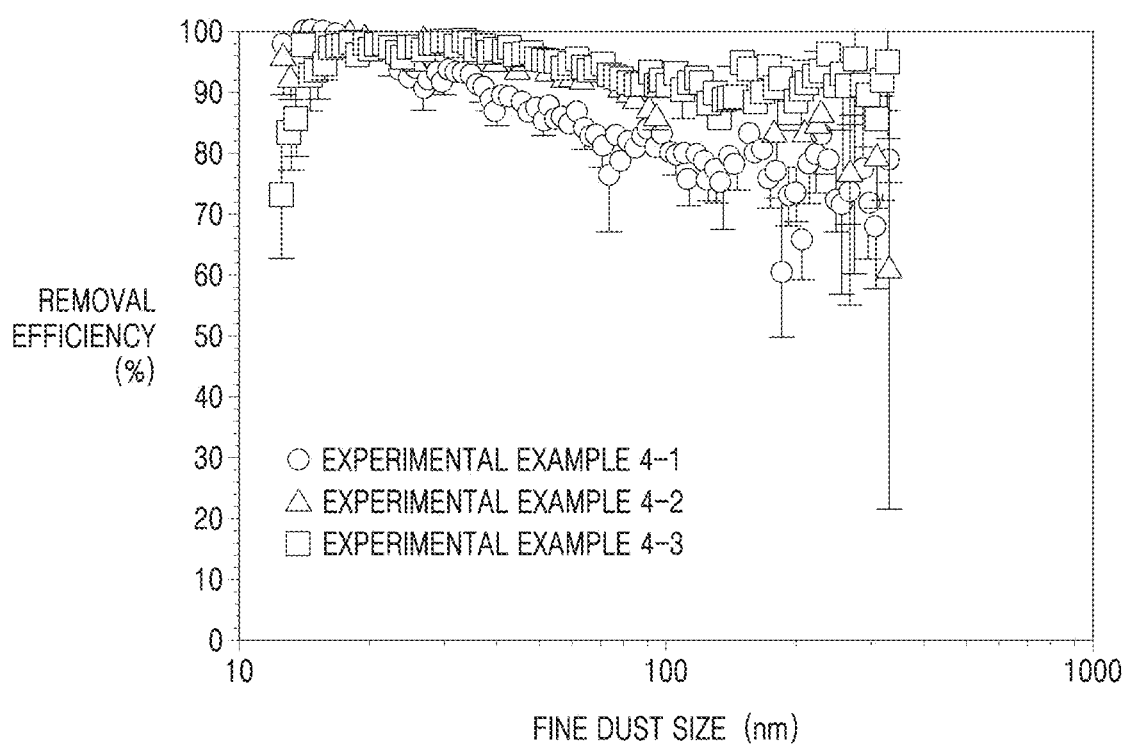
FIG. 5B is a graph showing plasma voltage and removal efficiency of fine dust according to an embodiment.

FIG. 5B is a graph showing plasma voltage and removal efficiency of fine dust according to an embodiment;

Experimental Example 4-1 to Experimental Example 4-3

At atmospheric pressure and a temperature close to room temperature, reaction between the fine dust PM and the water-insoluble organic compound $VOC_{insol}$ is carried out using the air purification device 1.

A volume flow rate of a mixture of the fine dust PM and contaminated air including toluene ($C_6H_5CH_3$) of 22 ppm that is the water-insoluble organic compound $VOC_{insol}$ is 10 L/min. As a dielectric barrier of the reactor 10, a quartz tube having an inner diameter of 20 mm and a thickness of 2 mm is used A stainless steel rod of a 2 mm diameter is used as a second electrode (22: a power electrode), and a silver paste film is used as the first electrode (21: a ground electrode). In the reactor 10, a discharge region having a length of 280 mm is surrounded by the ground electrode. A discharge gap between the inner surface of a glass tube and a high voltage electrode that is the second electrode 22 is 9 mm. In this case, the volume of the plasma discharge region is fixed to 80.865 $cm^3$. The plurality of dielectric particles 30 are completely filled in the packed-bed 11 provided in the plasma discharge region (i.e., the packed-bed 11). In this case, the plurality of dielectric particles 30 are spherical glass particles having a diameter of 2 mm, and the porosity of the packed-bed 11 is 53%. A liquid supplied to the inside of the reactor 10 is a sodium hydroxide (NaOH) aqueous solution having a concentration of 2.5 mmol/L and PH11, and is sprayed at a volume flow rate of 75 mL/min. A DC pulsed power supply is connected to the reactor 10, and a high voltage is continuously applied to a plasma discharge region through this electrical system.

In Experimental Example 4-1, the voltage applied to the plasma discharge region (i.e., the packed-bed 11) is 18 kV, and a frequency is 840 Hz. In Experimental Example 4-2, the voltage applied to the plasma discharge region is 20 kV and the frequency is 840 Hz. In Experimental Example 4-3, the voltage applied to the plasma discharge region is 22 kV and the frequency is 840 Hz. Regarding Experimental Examples 4-1 to 4-3, the purified air outlet 80 measures the fine dust PM, a residual ratio of toluene ($C_6H_5CH_3$) and a generation concentration of ozone ($O_3$).

In Experimental Example 4-1, the fine dust PM is removed by an average of 83% or more, and toluene ($C_6H_5CH_3$) is removed by 55% or more. In this case, ozone ($O_3$) of 10 ppm is generated.

In Experimental Example 4-2, the fine dust PM is removed by an average of 91% or more, and toluene ($C_6H_5CH_3$) is removed by 64% or more. In this case, ozone ($O_3$) of 25 ppm is generated.

In Experimental Example 4-3, the fine dust PM is removed by an average of 94% or more, and toluene ($C_6H_5CH_3$) is removed by 71% or more. In this case, ozone ($O_3$) of 38 ppm is generated.

Referring to Experimental Examples 4-1 to 4-3, it may be seen that the removal rate of the fine dust PM and toluene ($C_6H_5CH_3$) increases as the voltage applied to the plasma discharge region (i.e., the packed-bed 11) increases. However, it may be seen that oxygen ($O_2$) is decomposed during a plasma discharge process and thus a generation amount of ozone ($O_3$) increases. In order to remove contaminated air, the voltage applied to the plasma discharge region may increase, but the generation amount of ozone ($O_3$) also needs to be reduced. To this end, the alkaline strength PH of the liquid flowing into the reactor 10 may be adjusted.

Figure 6:
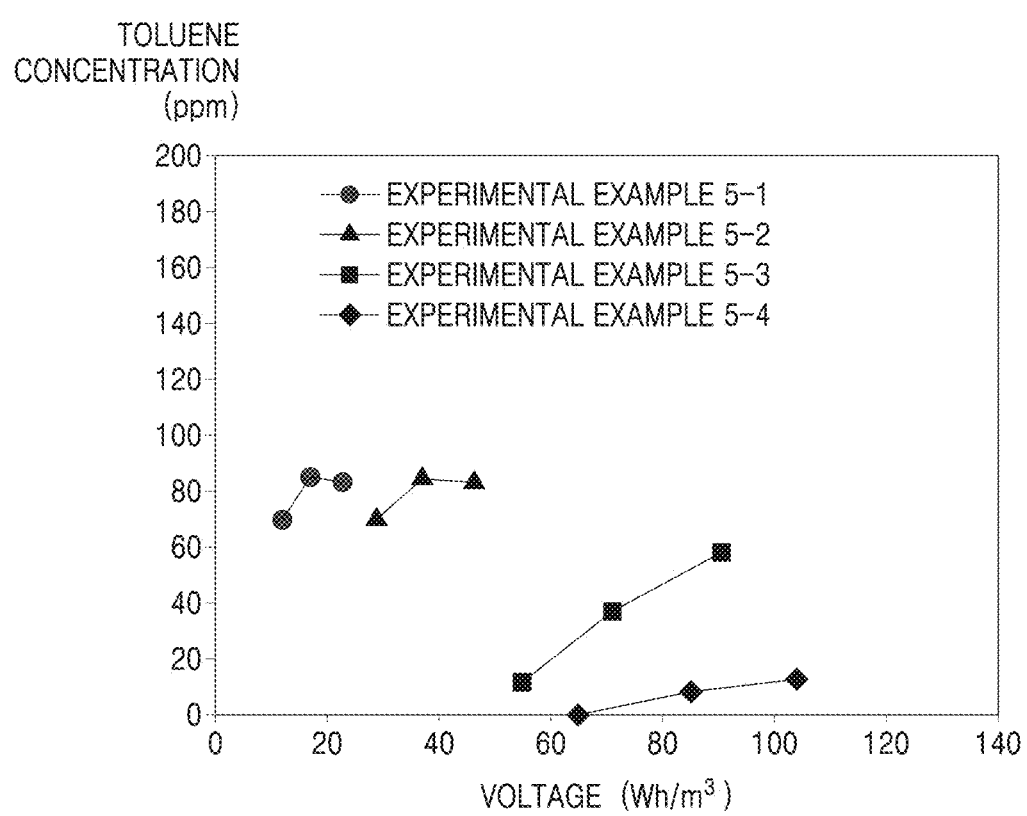
FIG. 6 is a graph showing a relationship between a plasma voltage and a concentration of ozone according to an embodiment and a comparative example.
Figure 7A:
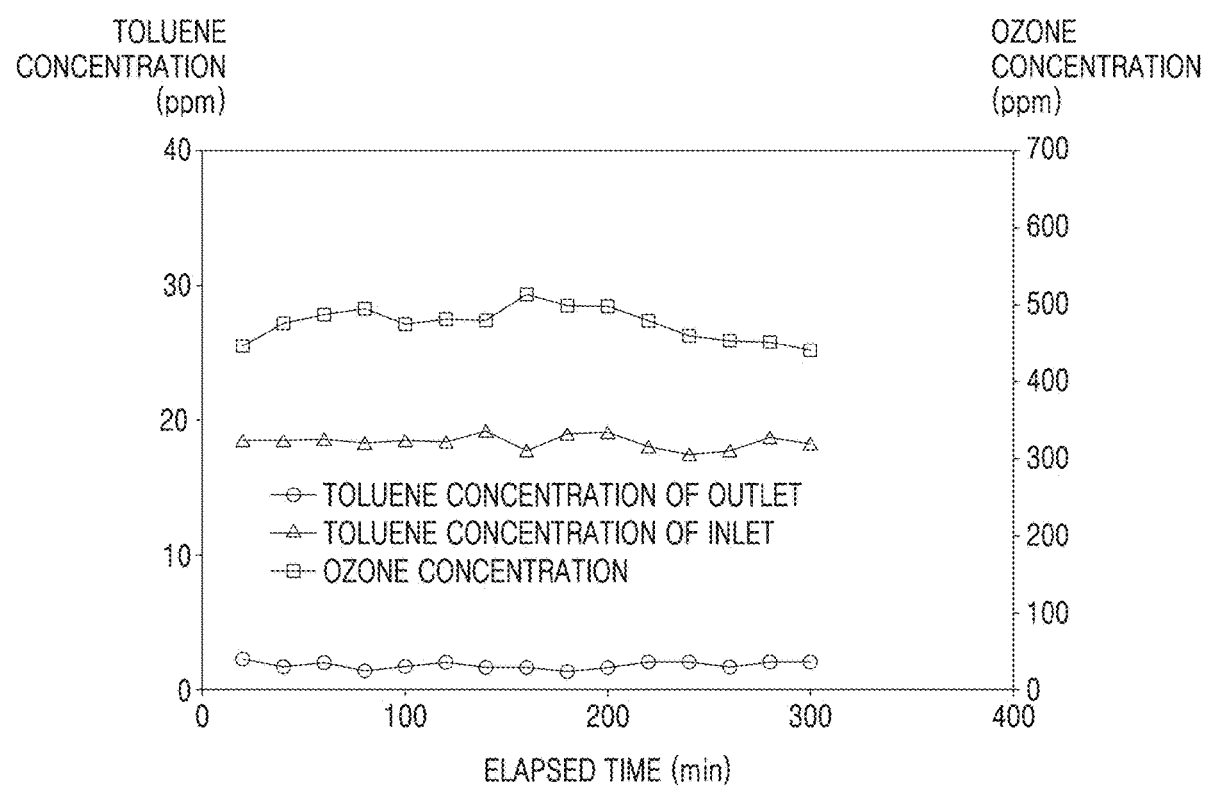
FIGS. 7A to 7D are graphs showing changes in a toluene concentration and an ozone concentration according to an experimental example.
Figure 7B:
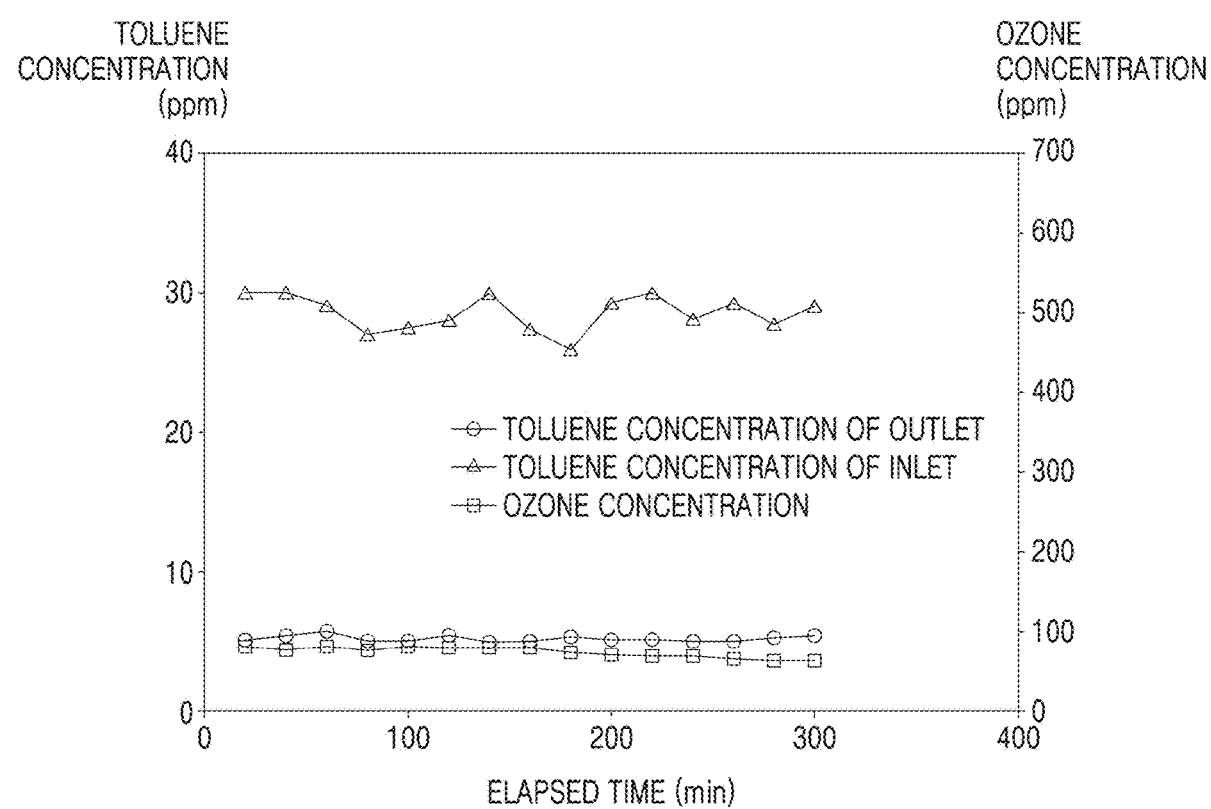
Figure 7C:
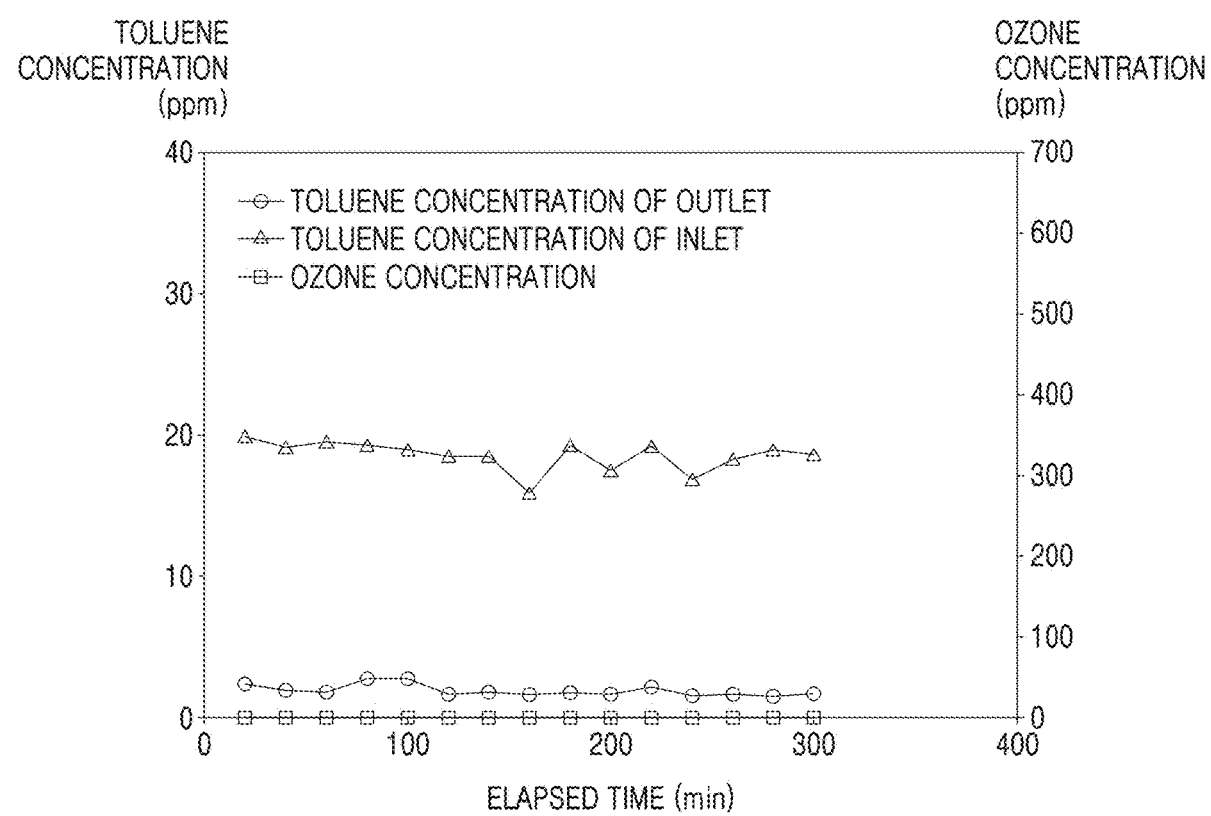
Figure 7D:
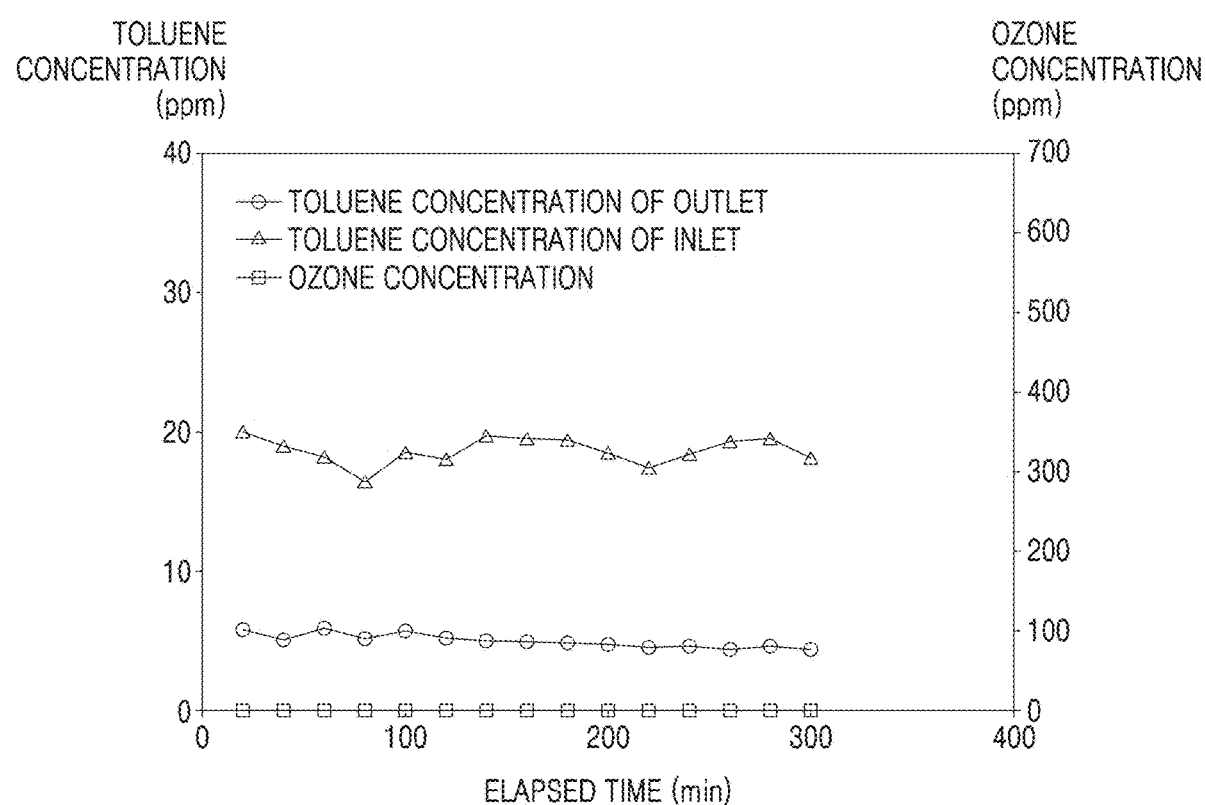

FIG. 6 is a graph showing a relationship between a plasma voltage and a concentration of ozone ($O_3$) according to an embodiment and a comparative example.

Experimental Example 5-1 to Experimental Example 5-4

At atmospheric pressure and a temperature close to room temperature, reaction of the water-insoluble organic compound $VOC_{insol}$ is carried out using the air purification device 1.

In Experimental Example 5-1, the water-insoluble organic compound $VOC_{insol}$ is toluene ($C_6H_5CH_3$) having a concentration of 23 ppm, and a volume flow rate of contaminated air including toluene ($C_6H_5CH_3$) is 10 L/min. As a dielectric barrier of the reactor 10, a glass tube having an inner diameter of 20 mm and a thickness of 2 mm is used. A stainless steel rod of a 2 mm diameter is used as a second electrode (22: a power electrode), and a silver paste film is used as the first electrode (21: a ground electrode). In the reactor 10, a discharge region having a length of 280 mm is surrounded by the ground electrode. A discharge gap between the inner surface of the quartz tube and a high voltage electrode that is the second electrode 22 is 9 mm. In this case, the volume of the plasma discharge region is fixed to 80.865 $cm^3$. The plurality of dielectric particles 30 are completely filled in the packed-bed 11 provided in the plasma discharge region (i.e., the packed-bed 11). In this case, the plurality of dielectric particles 30 are spherical glass particles having a diameter of 2 mm, and the porosity of the packed-bed 11 is 53%. No liquid is supplied into the reactor 10. A voltage applied to the plasma discharge region changes, and a frequency is 210 Hz.

In Experimental Example 5-2, the water-insoluble organic compound $VOC_{insol}$ is toluene ($C_6H_5CH_3$) having a concentration of 22 ppm, and the volume flow rate of contaminated air including toluene ($C_6H_5CH_3$) is 10 L/min. Water ($H_2O$) having a volume flow rate of 100 mL/min is supplied into the reactor 10. The remaining configuration is the same as in Experimental Example 5-1.

In Experimental Example 5-3, the water-insoluble organic compound $VOC_{insol}$ is toluene ($C_6H_5CH_3$) having a concentration of 24 ppm, and the volume flow rate of contaminated air including toluene ($C_6H_5CH_3$) is 10 L/min. Hydroxide (NaOH) aqueous solution having a volume flow rate of 100 mL/min and a molar concentration of 1.25 mmol/L is supplied into the reactor 10. The remaining the configuration is the same as in Experimental Example 5-1.

In Experimental Example 5-4, the water-insoluble organic compound $VOC_{insol}$ is toluene ($C_6H_5CH_3$) having a concentration of 25 ppm, and the volume flow rate of contaminated air including toluene ($C_6H_5CH_3$) is 10 L/min. Hydroxide (NaOH) aqueous solution having a volume flow rate of 100 mL/min and a molar concentration of 6.25 mmol/L is supplied into the reactor 10. The remaining configuration is the same as in Experimental Example 5-1.

Referring to Experimental Example 5-1, it may be seen that a concentration of ozone ($O_3$) increases even at the lowest discharge plasma voltage. Referring to Experimental Example 5-2, it may be seen that at a discharge plasma voltage higher than that of Experimental Example 5-1, the concentration of ozone ($O_3$) increases similarly to Experimental Example 5-1.

Referring to Experimental Example 5-3, it may be seen that the concentration of ozone ($O_3$) increases at a discharge plasma voltage higher than that of Experimental Example 5-2, and the concentration of ozone ($O_3$) remains lower than that of Experimental Example 5-1. Referring to Experimental Example 5-4, it may be seen that the concentration of ozone ($O_3$) increases at a discharge plasma voltage higher than that of Experimental Example 5-3, and the concentration of ozone ($O_3$) remains lower than that of Experimental Example 5-3.

When the plasma discharge voltage increases in the air purification device 1 according to an embodiment, a removal rate of the water-insoluble organic compound $VOC_{insol}$ may increase. When the plasma discharge voltage increases, the concentration of ozone ($O_3$) may increase during a process of decomposing oxygen ($O_2$). As in Experimental Examples 5-1 to 5-4, it may be seen that when the alkaline strength (PH) of the liquid supplied to the reactor 10 increases, an increase in the concentration of ozone ($O_3$) may be suppressed. Accordingly, the plasma discharge voltage may increase as the volume flow rate and a degree of contamination of the contaminated air $Air_1$ increase, and in this case, when the alkaline strength (PH) of the liquid supplied to the reactor 10 increases, not only the contaminated air $Air_1$ may be purified but also a generation of ozone ($O_3$) may be suppressed.

FIGS. 7A to 7D are graphs showing changes in a toluene concentration and an ozone concentration according to an experimental example.

Experimental Example 6-1 to Experimental Example 6-4

At atmospheric pressure and a temperature close to room temperature, a reaction of the water-insoluble organic compound $VOC_{insol}$ is carried out using the air purification device 1.

In Experimental Example 6-1, the water-insoluble organic compound $VOC_{insol}$ is toluene ($C_6H_5CH_3$) having a concentration of 23 ppm, and a volume flow rate of contaminated air including toluene ($C_6H_5CH_3$) is 10 L/min. As a dielectric barrier of the reactor 10, a glass tube having an inner diameter of 20 mm and a thickness of 2 mm is used. A stainless steel rod of a 2 mm diameter is used as a second electrode (22: a power electrode), and a silver paste film is used as the first electrode (21: a ground electrode). In the reactor 10, a discharge region having a length of 280 mm is surrounded by the ground electrode. A discharge gap between the inner surface of the quartz tube and a high voltage electrode that is the second electrode 22 is 9 mm. In this case, the volume of the plasma discharge region is fixed to 80.865 $cm^3$. The plurality of dielectric particles 30 are completely filled in the packed-bed 11 provided in the plasma discharge region (i.e., the packed-bed 11). In this case, the plurality of dielectric particles 30 are spherical alumina particles having a diameter of 2.2 mm, and the porosity of the packed-bed 11 is 53%. No liquid is supplied into the reactor 10. A voltage applied to the plasma discharge region changes, and a frequency is 210 Hz.

In Experimental Example 6-2, the water-insoluble organic compound $VOC_{insol}$ flowing into the reactor 10 is toluene ($C_6H_5CH_3$) of 30 ppm, and the volume flow rate of contaminated air including toluene ($C_6H_5CH_3$) is 10 L/min. A liquid flowing into the reactor 10 is water ($H_2O$), and the volume flow rate thereof is 100 mL/min. The remaining configuration is the same as in Experimental Example 6-1.

In Experimental Example 6-3, the water-insoluble organic compound $VOC_{insol}$ flowing into the reactor 10 is toluene ($C_6H_5CH_3$) of 25.5 ppm, and the volume flow rate of contaminated air including toluene ($C_6H_5CH_3$) is 10 L/min. No liquid flows into the reactor 10. A reactor filled with a manganese dioxide (MnO2) catalyst is connected to a rear end of the reactor, and a volume of the filled manganese dioxide catalyst is 80 cm³. The remaining configuration is the same as in Experimental Example 6-1.

In Experimental Example 6-4, the water-insoluble organic compound $VOC_{insol}$ flowing into the reactor 10 is toluene ($C_6H_5CH_3$) of 20 ppm, and the volume flow rate of contaminated air including toluene ($C_6H_5CH_3$) is 10 L/min. A liquid flowing into the reactor 10 is water ($H_2O$), and the volume flow rate thereof is 100 mL/min. The reactor filled with a manganese dioxide (MnO2) catalyst is connected to the rear end of the reactor, and the volume of the filled manganese dioxide catalyst is 80 cm³. The remaining configuration is the same as in Experimental Example 6-1.

In Experimental Example 6-1, a toluene removal rate is 90%, and the ozone concentration is 476 ppm.

In Experimental Example 6-2, the toluene removal rate is 82%, and the ozone concentration is 74 ppm.

In Experimental Example 6-3, the toluene removal rate is 89%, and the ozone concentration is less than 1 ppm.

In Experimental Example 6-4, the toluene removal rate is 73%, and the ozone concentration is less than 1 ppm.

Referring to Experimental Examples 6-3 to 6-4, it may be seen that the ozone concentration may be reduced to less than 1 ppm by introducing an ozone removal catalyst such as manganese dioxide (MnO2). In this case, it may be seen that the presence or absence of an inflow liquid does not affect the ozone removal performance of the catalyst.

Figure 8A:
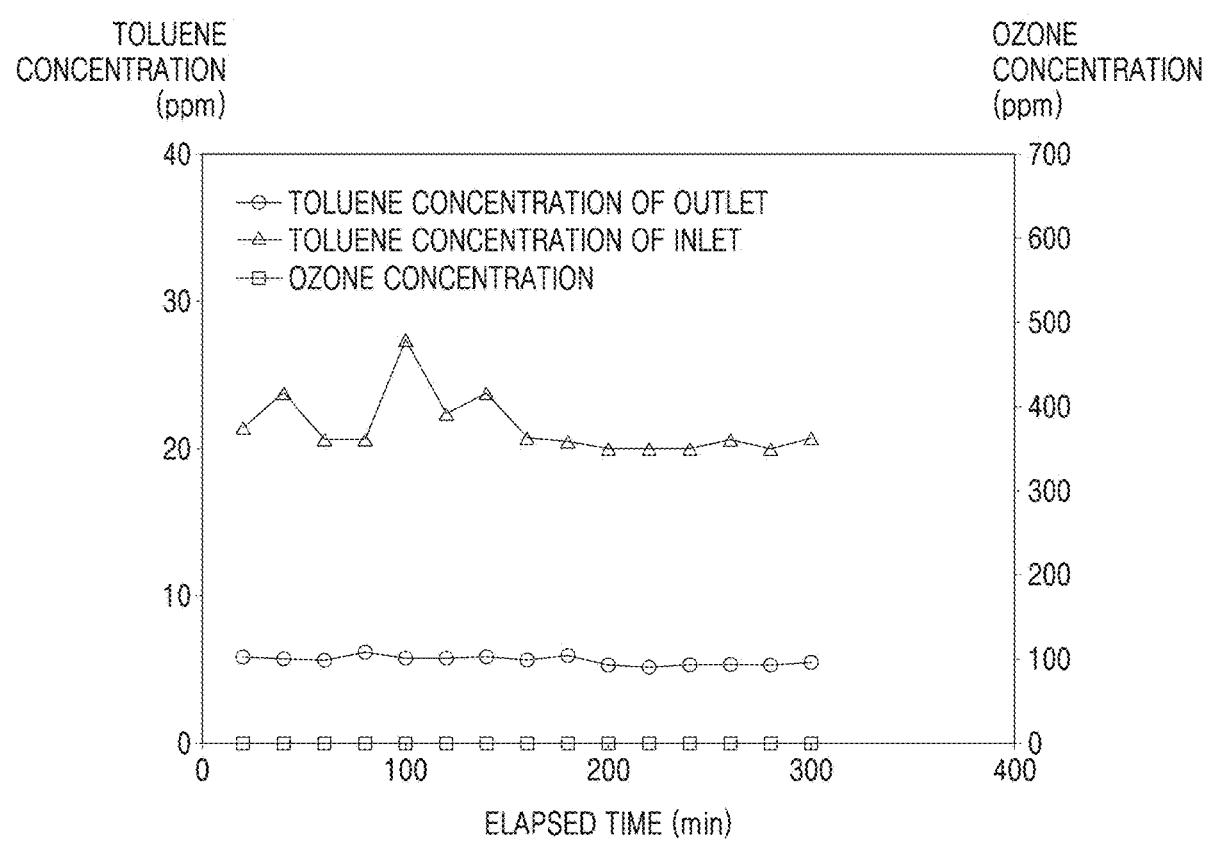
FIGS. 8A and 8B are graphs showing changes in a toluene concentration and an ozone concentration according to an experimental example.
Figure 8B:
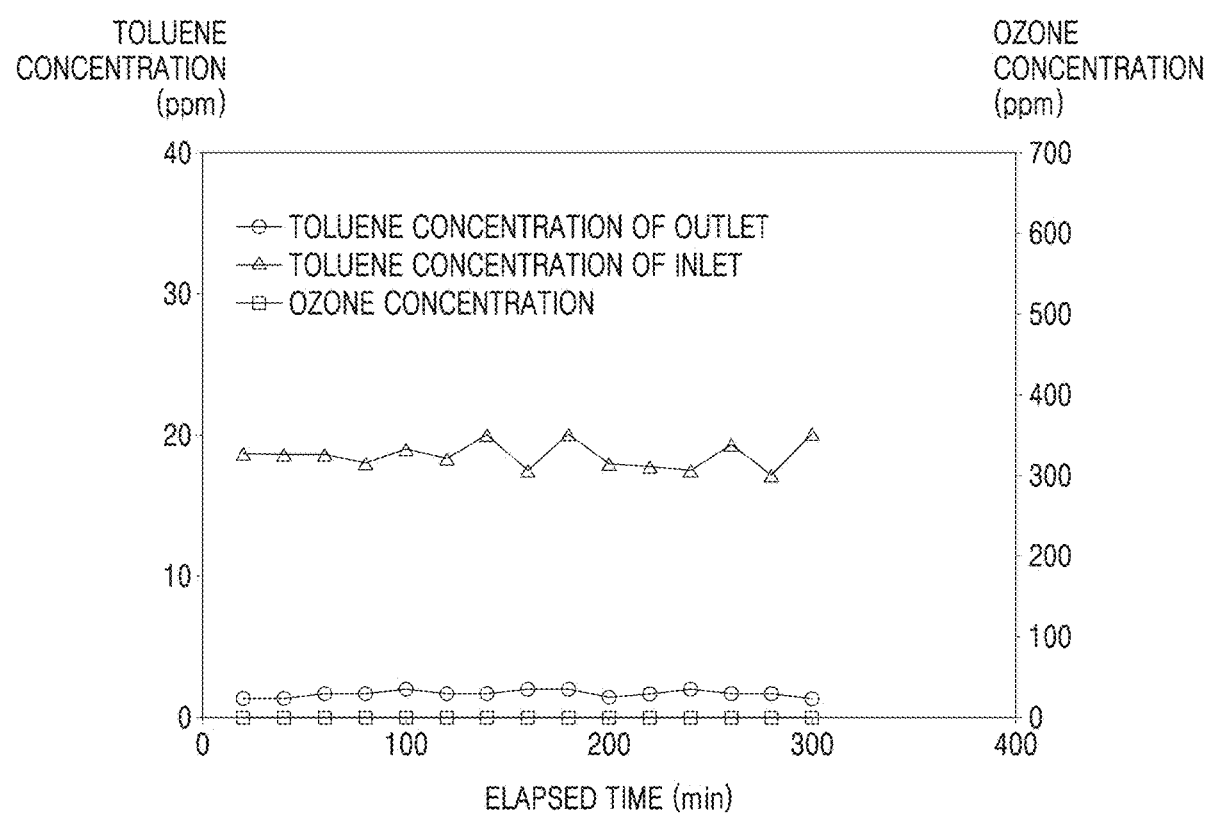

FIGS. 8A to 8B are graphs showing changes in a toluene concentration and an ozone concentration according to experimental examples.

Experimental Example 7-1 to Experimental Example 7-2

At atmospheric pressure and a temperature close to room temperature, a reaction of the water-insoluble organic compound $VOC_{insol}$ is carried out using the air purification device 1.

In Experimental Example 7-1, the water-insoluble organic compound $VOC_{insol}$ is toluene ($C_6H_5CH_3$) having a concentration of 22 ppm, and a volume flow rate of a mixture including contaminated air including toluene ($C_6H_5CH_3$) and the find dust PM is 10 L/min. No liquid is supplied into the reactor 10. A reactor filled with a manganese dioxide (MnO2) catalyst is connected to a rear end of the reactor, and a volume of the filled manganese dioxide catalyst is 80 cm³. The remaining configuration is the same as in Experimental Example 6-1.

In Experimental Example 7-2, the water-insoluble organic compound $VOC_{insol}$ is toluene ($C_6H_5CH_3$) having a concentration of 22 ppm, and the volume flow rate of the mixture including contaminated air including toluene ($C_6H_5CH_3$) and the find dust PM is 10 L/min. A liquid flowing into the reactor 10 is water ($H_2O$), and the volume flow rate thereof is 100 mL/min. The reactor filled with a manganese dioxide (MnO2) catalyst is connected to the rear end of the reactor, and the volume of the filled manganese dioxide catalyst is 80 cm³. The remaining configuration is the same as in Experimental Example 6-1.

In Experimental Example 7-1, the fine dust PM is removed by an average of 99% or more, and toluene ($C_6H_5CH_3$) is removed by 91% or more. A generation amount of ozone ($O_3$) is less than 1 ppm.

In Experimental Example 7-2, the fine dust PM is removed by an average of 99% or more, and toluene ($C_6H_5CH_3$) is removed by 74% or more. The generation amount of ozone ($O_3$) is less than 1 ppm.

Referring to Experimental Examples 7-1 to 7-2, it may be seen that even when the fine dust PM and toluene ($C_6H_5CH_3$) are supplied simultaneously, an ozone removal catalyst such as manganese dioxide (MnO2) is introduced to reduce the ozone concentration to less than 1 ppm.

Figure 9:
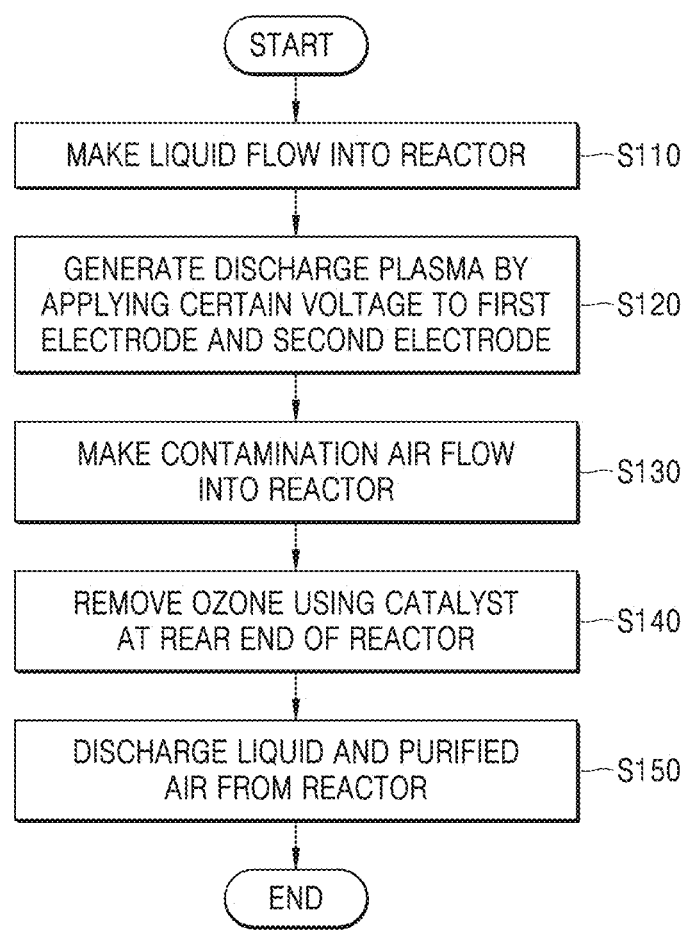
FIG. 9 is a flowchart of an air purification method according to an embodiment.

FIG. 9 is a flowchart of an air purification method according to an embodiment.

Referring to FIGS. 1 and 9, a liquid may flow into the reactor 10 according to an embodiment (S110). As an example, the reactor 10 may have a flow path through which the liquid and the contaminated air $Air_1$ may move. In this regard, the liquid may be water or a basic aqueous solution.

Next, a discharge plasma may be generated by applying a certain voltage to the first electrode 21 and the second electrode 22 (S120). As an example, the first electrode 21 may be disposed on an outer wall of the reactor 10 as a ground electrode, and the second electrode 22 may be disposed inside the reactor 10 as a power electrode. In this regard, the first electrode 21 and the second electrode 22 may be spaced apart from each other with a predetermined distance therebetween. By applying the certain voltage to the first electrode 21 and the second electrode 22, the discharge plasma is generated in the packed-bed 11. In this regard, a magnitude of the voltage applied to the first electrode 21 and the second electrode 22 may be controlled through the controller 90.

Next, the contaminated air $Air_1$ may flow into the reactor 10 (S130). As an example, the contaminated air $Air_1$ may be a mixture gas including at least one of the fine dust PM, the water-soluble organic compound $VOC_{sol}$, and the water-insoluble organic compound $VOC_{insol}$. A volume flow rate of the contaminated air $Air_1$ may increase or decrease according to a purification capability of the air purification device 1. The contaminated air $Air_1$ flowing into the reactor 10 may be collected by the liquid or decomposed into carbon dioxide ($CO_2$) and water ($H_2O$) by plasma.

Next, ozone may be removed by using a catalyst at a rear end of the reactor 10 (S140). As an example, the catalyst included in the catalyst reactor 95 may include at least one of manganese oxide, copper oxide, and aluminum oxide, or at least one of mixtures between the substances.

Next, the liquid and purified air may be discharged from the reactor 10 (S150). According to an embodiment, the liquid obtained by collecting part of the contaminated air $Air_1$ and purified air $Air_2$ obtained by decomposing part of the contaminated air $Air_1$ may be discharged to the outside of the reactor 10.

The liquid obtained by collecting the part of the contaminated air $Air_1$ may be stored in the liquid recoverer 50. The liquid stored in the liquid recoverer 50 may move to the liquid supplier 40 using the pump 60 after removing the contaminated air $Air_1$ using a purification device. Accordingly, the liquid supplier 40 may reuse purified water or a basic aqueous solution.

According to the above-described embodiments of the air purification device and air purification method, fine dust and a contaminant are ionized or decomposed by a discharge plasma, and may be easily discharged from a reactor after collected in a liquid passing through a reactor. Therefore, the fine dust and the contaminant in the air are more easily collected in the liquid and discharged to the outside, and thus an excellent contaminant removal performance may be implemented. In addition, the liquid in which the fine dust and the contaminant are collected is easily discharged from the reactor, and thus the burden of periodic management or replacement of the reactor may be reduced.

The embodiments of the air purification device and the air purification method have been described with reference to the drawings for better understanding, but this is only exemplary, and it will be understood by those of ordinary skill in the art that various modifications and equivalent other embodiments are possible therefrom. Therefore, the true technical protection scope of the present disclosure should be determined by the appended claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An air purification device comprising:
   a reactor having a hollow shape and extending in one direction;
   a discharge plasma generator comprising a first electrode disposed on an outer wall of the reactor and a second electrode disposed inside the reactor, wherein the discharge plasma generator is configured to generate a discharge plasma in a discharge region;
   a plurality of dielectric particles disposed on a packed-bed of the reactor;
   a liquid supplier which supplies a liquid between the first electrode and the second electrode; and
   a liquid recoverer which recovers the liquid discharged from the reactor,
   wherein the plurality of dielectric particles are disposed between the first electrode and the second electrode.

2. The air purification device of claim 1, wherein the liquid comprises water.

3. The air purification device of claim 1, wherein the liquid comprises a basic aqueous solution.

4. The air purification device of claim 3, wherein the liquid is an aqueous sodium hydroxide solution having a molar concentration equal to or more than about 2 millimoles per liter (mmol/L) and equal to or less than about 20 mmol/L.

5. The air purification device of claim 1, further comprising a pump which generates a pressure for delivering the liquid stored in the liquid recoverer to the liquid supplier.

6. The air purification device of claim 1, wherein a porosity in the packed-bed is more than about 0 percentages (%) and equal to or less than about 60%.

7. The air purification device of claim 6, wherein an average particle diameter of the plurality of dielectric particles is equal to or more than about 1 millimeters (mm) and equal to or less than about 20 mm.

8. The air purification device of claim 1, wherein the plurality of dielectric particles comprises at least one of silicon oxide, boron oxide, aluminum oxide, manganese oxide, titanium oxide, barium oxide, copper oxide, or magnesium oxide.

9. The air purification device of claim 1, wherein a voltage equal to or more than about 2 kilovoltages (kV) and equal to or less than about 500 kV is applied to the discharge region.

10. The air purification device of claim 1, further comprising:
    a high voltage generator which apples a voltage to an inside of the reactor; and
    a controller which controls a generation of the voltage of the high voltage generator,
    wherein the controller is configured to transmit a control signal for increasing a magnitude of the voltage generated by the high voltage generator to the high voltage generator as an inflow amount of contaminated air which flows into the reactor increases.

11. The air purification device of claim 1, wherein the first electrode is a silver paste film.

12. The air purification device of claim 1, wherein the second electrode extends in the one direction and is spaced apart from the first electrode with a predetermined distance therebetween.

13. The air purification device of claim 1, wherein the reactor is a glass conduit extending in the one direction.

14. The air purification device of claim 1, further comprising a catalyst reactor disposed at a rear end of the reactor and capable of removing ozone discharged from the reactor using a catalyst.

15. The air purification device of claim 14, wherein the catalyst comprises at least one of manganese oxide, copper oxide, or aluminum oxide.

16. The air purification device of claim 1, wherein a water film is formed on the surface of each of the plurality of dielectric particles by the liquid.

17. An air purification method for purifying contaminated air using the air purification device of claim 1, the air purification method comprising:
    making a liquid flow into the reactor;
    generating a discharge plasma by applying a voltage to the first electrode and the second electrode;
    making the contaminated air flow into the reactor; and
    discharging the liquid and purified air from the reactor.

18. The air purification method of claim 17, further comprising supplying the liquid discharged from the reactor into the liquid supplier.

19. The air purification method of claim 17, wherein the liquid comprises water.

20. The air purification method of claim 17, wherein the liquid comprises a basic aqueous solution.

21. The air purification method of claim 20, wherein an alkaline strength (PH) of the basic aqueous solution is determined according to an ozone concentration inside the reactor.

22. The air purification method of claim 17, wherein a voltage equal to or more than about 2 kV and equal to or less than about 500 kV is applied to generate the discharge plasma.

23. The air purification method of claim 17, further comprising removing ozone using a catalyst at a rear end of the reactor.

24. The air purification method of claim 23, wherein the catalyst comprises at least one of manganese oxide, copper oxide, or aluminum oxide.

25. The air purification method of claim 17, wherein a water film is formed on the surface of each of the plurality of dielectric particles by the liquid.

* * * * *